United States Patent [19]

Perkins, Jr.

[11] 4,283,747

[45] Aug. 11, 1981

[54] METHODS OF MAKING A GAS TUBE SURGE PROTECTOR

[75] Inventor: Carl C. Perkins, Jr., Prairie Village, Kans.

[73] Assignee: Western Electric Co., Inc., New York, N.Y.

[21] Appl. No.: 972,106

[22] Filed: Dec. 21, 1978

[51] Int. Cl.[3] .......... H02H 3/22

[52] U.S. Cl. .......... 361/117; 29/25.11; 324/409; 361/119; 361/120

[58] Field of Search .......... 361/117, 119, 120; 324/61 R, 400, 401, 403, 405, 409, 410; 313/326, 200, 199, 146-148; 29/25.11, 25.16, 25.15

[56] References Cited

U.S. PATENT DOCUMENTS

| | | | |
|---|---|---|---|
| 2,899,634 | 8/1959 | Carbonneau | 324/401 |
| 3,229,145 | 1/1966 | Jensen | 361/120 X |
| 3,408,525 | 10/1968 | Bahr | 313/146 |
| 3,432,282 | 3/1969 | Schulz . | |
| 3,564,473 | 2/1971 | Kawiecki . | |
| 3,716,782 | 2/1973 | Henry | 324/61 R |
| 3,780,350 | 12/1973 | Sanger et al. | 361/120 X |

FOREIGN PATENT DOCUMENTS 1089482 3/1961 Fed. Rep. of Germany .

*Primary Examiner*—Harry E. Moose, Jr.
*Attorney, Agent, or Firm*—W. O. Schellin

[57] ABSTRACT

A gas tube surge protector (11) includes a housing (12) and spaced electrodes (14 and 16) which form a gastight envelope (27). A width of a gap (31) between the electrodes is precisely established by urging at last one of the electrodes (14) toward the other. By moving a plunger (66) a stressed center (43) plastically yields to establish the desired gap width. The gap width is controlled by a test set (76) which measures the electrical characteristics of the surge protector.

6 Claims, 3 Drawing Figures

METHODS OF MAKING A GAS TUBE SURGE PROTECTOR

TECHNICAL FIELD

This invention relates to electrical protective devices, and in particular to a gas tube surge protector which may typically be used in telecommunications systems, and to methods of making such a device.

BACKGROUND OF THE INVENTION

To protect electronic telecommunications equipment from damage due to lightning strikes or other overvoltage causing hazards, surge protectors are commonly coupled between transmission lines and ground. Surge protectors may also be used in the protection of other electrical or electronic equipment. These surge protectors offer a normally electronically open condition between the lines and ground. A voltage surge, however, causes a spark to be initiated across a spark gap. A gas in the gap becomes ionized to render the space across the gap conductive until the overvoltage causing energy is dissipated.

A typical gas tube protector structure includes a dielectric envelope for mounting two electrically spaced electrodes opposite one another. One type of prior art protector uses a relatively wide gap between faces of the two electrodes. An auxiliary electrode is used to promote an initiation of an ionizing spark. After the gas becomes ionized the resistance across the gap between the faces of the electrodes drops, and the electric discharge occurs between the faces of the electrodes. To insure a low resistance across the gap while the gas is in an ionized state, the gas pressure within the envelope is maintained below atmospheric pressure, typically at about one-tenth of an atmosphere. A disadvantage of such low pressure protectors is that any leakage of air into the envelope causes the protectors to fail in an open condition, meaning that the spark is no longer sustainable across the gap of the protector at a sufficiently low voltage to dissipate the overvoltage energy.

Various ways have been thought of to ensure that protectors fail in an electrically shorted condition. Even though a shorted condition tends to shut down the electronic equipment temporarily, such a temporary shutdown of the electronic equipment is usually preferred over the alternative, an open failure of the surge protector, which leaves the equipment without protection from damage due to overvoltage conditions.

One way to minimize or eliminate a tendency of the protectors to fail open is to narrow the gap between the electrodes and at the same time pressurize the envelope of the protectors with the ionizable gas to about the same as or to above atmospheric pressure. Such a pressurization tends to offset a decrease in the breakdown voltage which is otherwise experienced when the gaps are made more narrow than the gaps of low pressure surge protectors. A subsequently occuring leak in the envelope then does not significantly alter the resistance between the electrodes of the protector, e.g., the protector will not fail in an open condition.

A problem associated with narrowing the gap and concurrently pressurizing the ionizable gas to or above atmospheric pressure is that the resistivity per length of the spark gap is increased. Tolerances on the relatively small gap become extremely small to achieve device characteristics which fall into pre-established desirable ranges. For example, when the gas pressure in the envelope is increased to approximately one and one-half atmospheres, a desirable gap width between the electrodes of the protector is approximately $50 \times 10^{-6}$ meters or 50 microns. However, eve a ten percent tolerance on such a dimension is too small and difficult to maintain in the assembly of surge protectors under typical present day manufacturing conditions.

One prior art surge protector uses a relatively wide gap in conjunction with a gas under partial atmospheric pressure within the envelope of the surge protector. A second narrow gap is established by a dielectric spacer external to the envelope. The second gap is intended to function as a safety gap to initiate an arc at a slightly higher than normal voltage, but only when the surge protecting function within the surge protector has failed in the open condition. The exposed location of the electrodes forming the second gap do, however, tend to alter the characteristics of the second gap.

SUMMARY OF THE INVENTION

Accordingly, it is an object of the invention to provide a novel gas tube surge protector with a small gap in which a gas in the protector can be maintained near or above atmospheric pressure, and which has readily reproducible breakdown characteristics within a specified range of values.

It is another object of the invention to adjust the breakdown characteristics of a gas tube surge protector into a desirable range during or as part of the assembly of such a protector.

According to the invention a gas tube surge protector has a housing. Two electrodes are mounted within the housing, opposite one another and with a gap therebetween. The width of the gap is defined by an initial length of each of the electrodes, by the mounting position of each of the electrodes with respect to the housing and by the amount of strain in a stressed section in at least one of the group of the housing and the electrodes.

A method of making a surge protector in accordance with the invention includes assembling electrodes together with a housing into a gastight, unitary structure wherein the electrodes face each other and then adjusting the width of a gap between the electrodes by straining or elongating a tubular section of at least one of the electrodes to obtain predetermined operating characteristics in the surge protector.

BRIEF DESCRIPTION OF THE DRAWING

The following detailed description will be better understood when read in conjunction with the accompanying drawing, wherein.

DETAILED DESCRIPTION

Figure 1:
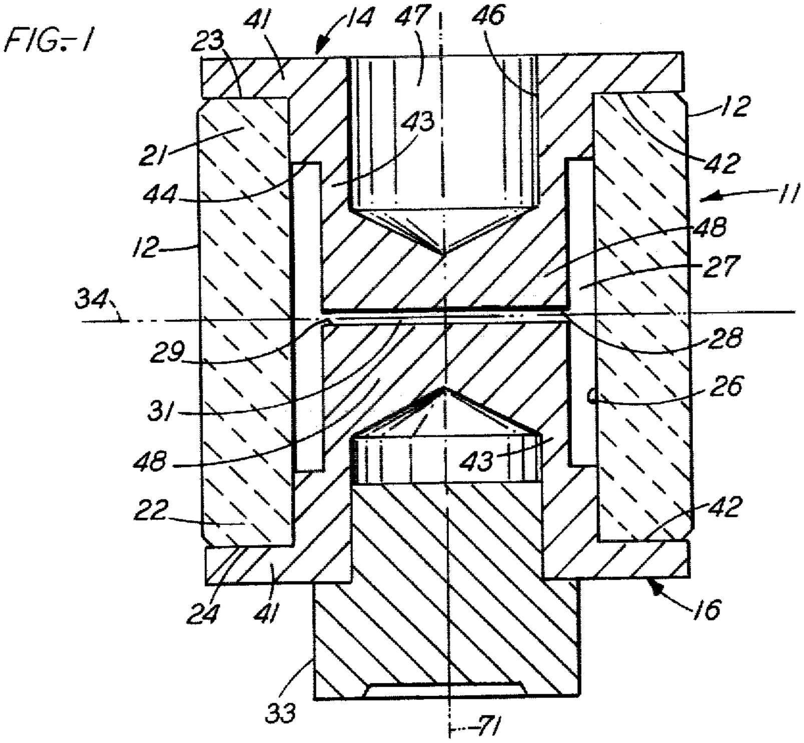
FIG. 1 is a cross-sectional view through a gas tube surge protector according to the invention.

FIG. 1 shows a cross-sectional view taken through a gas tube surge protector, designated generally by the numeral 11. The surge protector 11 preferably has a housing 12 in the shape of a hollow right cylinder. The housing 12 mounts and electrically spaces two electrodes 14 and 16. To space the electrodes 14 and 16 electrically, the housing is at least in part of an insulative or dielectric material, such as an aluminum oxide ceramic. Other materials, even a combination of parts including a conductive spacer ring, may be acceptable as long as the housing 12 includes at least two electrically and physically spaced portions 21 and 22 for mounting the electrodes 14 and 16 in spaced relationships to each other.

The electrodes 14 and 16 are mounted in the preferred embodiment of FIG. 1 to oppositely facing end surfaces 23 and 24 of portions 21 and 22, respectively. It is desired to form a gastight seal between the housing 12 and the electrodes 14 and 16. The ceramic material of the housing 12 is typically prepared for mounting the metal electrodes 14 and 16 by selective metalization of the contacting surfaces. Accordingly, the end surfaces 23 and 24 adjacent an inner wall 26 of the housing 12 are treated with a molybdenum-manganese paste. The paste is then sintered. Thereafter, the sintered molybdenum-manganese film is nickel plated. The nickel plated portions of the housing 12 permit such a gastight seal to be formed between the housing 12 and the electrodes 14 and 16. The housing 12 together with the electrodes 14 and 16 therefore forms an envelope 27 for containing an ionizable gas, such as argon.

Figure 3:
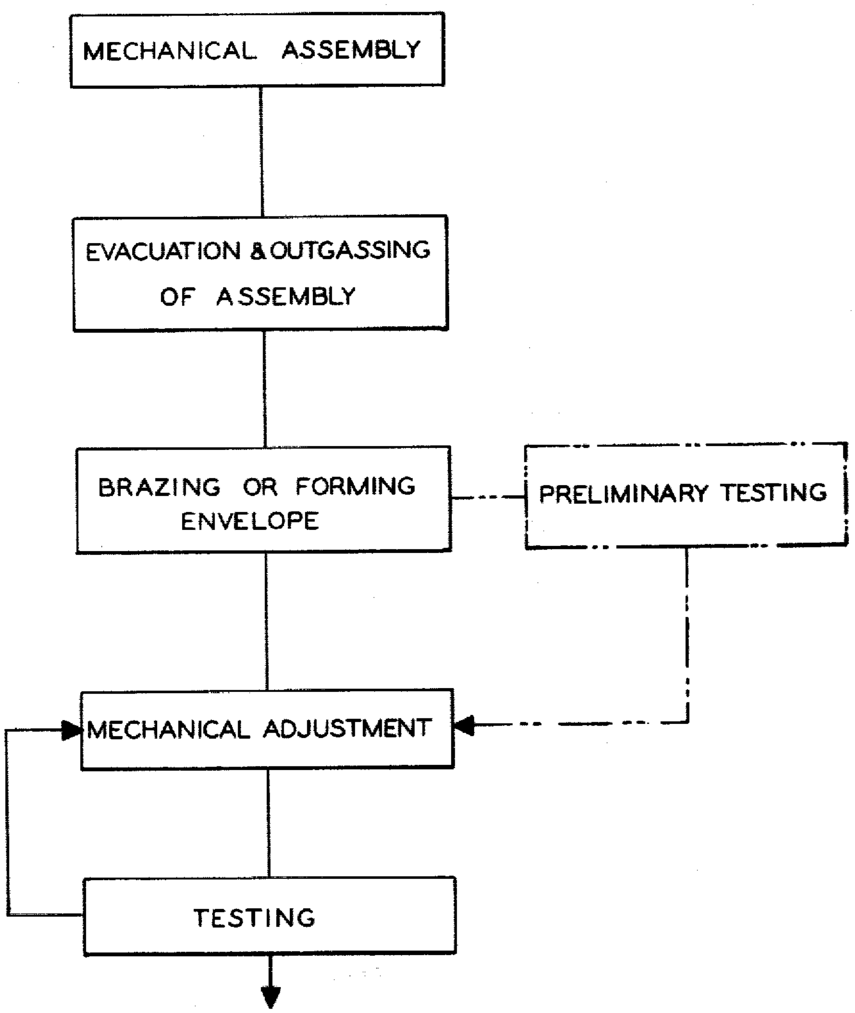
FIG. 3 is a flow diagram showing major steps of the assembly of the protector of FIG. 1 in accordance with the invention.

In the assembly of the surge protector 11, see FIG. 3, after placing the electrodes 14 and 16 with, for instance, brazing preforms (not shown) in contact with the housing 12, or by applying brazing metal in any other desired manner, the envelope 27 thus formed is first evacuated and outgassed by techniques well known in the art. Thereafter, and preferably at a temperature of up to 700° Celsius, an ionizable gas, such as argon is back-filled into the envelope 27 to a pressure of approximately 3.75 atmospheres, absolute. The temperature of the assembly of the housing 12 and the electrodes 14 and 16 is then increased until the brazing preforms, typically a silver-copper alloy, melt, e.g., at a temperature of approximately 790° Celsius. The brazed surge protector 11 is then slowly cooled. Cooling reduces the pressure of the back-filled gas in the envelope 27 which is now gastight. Typically, it is desired to retain the gas pressure approximately at one-half atmosphere above atmospheric pressure at normal room temperatures.

Referring again to FIG. 1, the surge protector 11 is now assembled and sealed, with two faces 28 and 29 of the electrodes 14 and 16, respectively, opposite and facing one another. A gap 31 separates the faces 28 and 29. A desired breakdown voltage across the gap in a range between 300 and 400 volts and a desired surge-limiting voltage between 300 to 800 volts require the gap to be about $50\times10^{-6}$ meters or 50 microns with the gas pressure in the gap at or slightly higher than atmospheric pressure, e.g., at one-half atmosphere above atmospheric pressure. However, when reasonable and reproducible manufacturing tolerances are applied to the height of the housing 12 and to the lengths to which the electrodes 14 and 16 extend into the housing 12, a typical range for the width of the gap 31 falls between the desired minimum of 50 microns and a maximum of about 460 microns. Such typical tolerances become, however, unacceptably large in relationship to the gap dimension which lies within a narrow range about 50 microns in order to obtain the desired breakdown voltage and surge limiting voltage characteristics of the surge protector 11.

The electrodes 14 and 16 are preferably made to identical dimensions in the same machining process. In FIG. 1, the electrode 16 is fitted with a stud 33. The stud 33 functions as an adapter for the surge protector 11 to fit dimensionally into an adapter unit (not shown). Except for the stud 33, the assembly of the housing 12 and the two electrodes 14 and 16 is preferably symmetrical about a plane 34 parallel to the faces 28 and 29 of the electrodes 14 and 16 and through the center of the gap 31.

Each electrode 14 or 16 has distinct portions of which the same portions of each of the electrodes are identified by the same numeral. A base 41 including a shoulder 42 is the portion that has been brazed to the housing 12. A tubular midsection or center 43 is formed by an external diameter-reducing step 44 and an internal bore 46 forming a cavity 47. The center 43 supports an inner portion or tip 48 in each electrode 14 and 16. In relationship to the base 41 and to the tip 48, the center 43 represents a section of reduced material thickness.

The material of the electrodes 14 and 16, and also of the stud 33, is a commercially available oxygen free copper. Preferably the faces 28 and 29 and sometimes portions of adjacent surfaces of the electrodes 14 and 16 located within the envelope 27 are coated with a carbon film which is applied in a known manner. The carbon film prevents material transfer of the copper as a result of electrical discharges across the gap 31. Such material transfer would tend to cause premature shorting of the gap 31 by bridging copper whiskers. While such a shorting failure of the surge protector 11 as an ultimate failure mechanism is not undesirable, it is nevertheless undesirable if it occurs prematurely after only a few surge protecting operations.

Figure 2:
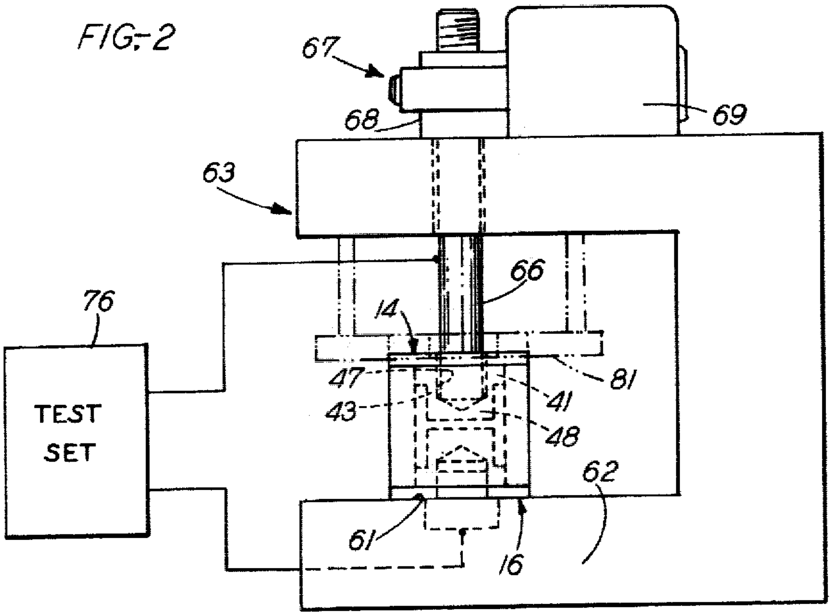
FIG. 2 is a schematic drawing of an apparatus which may be used in practicing the methods of the invention in conjunction with the assembly of the protector of FIG. 1.

Referring now to FIG. 2 and to the process diagram of FIG. 3, brazing the electrodes 14 and 16 to the housing 12 is followed by adjusting the gap 31 of the surge protector 11 to bring its surge transmission characteristics into their desired range. To make desired adjustments, an initial voltage breakdown test may be desirable. The preferred range of tolerances includes as a lower limiting dimension a gap width of 50 microns which translates into a breakdown voltage $V_B$ and a surge limiting voltage $V_L$ within the respective desired ranges of $V_B=300$ to 400 volts and $V_L=300$ to 800 volts. The necessary adjustment can then be predicated on the initial test to bring the gap 31 into the desired range of values. In a limiting situation the surge protector 11 may already possess the desired characteristics and no adjustment of the gap 31 is then necessary.

To adjust the surge protector, the electrode 16 including the stud 33 is solidly supported against a seat 61 of a base 62 on an adjustment apparatus 63. A plunger 66 which is movably mounted with respect to the base 62 is vertically driven by a force supporting advance mechanism 67. The advance mechanism 67 may be predicated on well known hydraulic cylinder principles in which a predetermined force can be exerted by the plunger 66. In an alternate and presently preferred mechanism 67, the plunger 66 is advanced by a mechanical screw drive 68. The screw drive is desirably advanced by an incremental or stepping motor 69.

The plunger 66 is inserted into the cavity 47 of the electrode 14. As the motor 69 advances the plunger 66, a force develops which urges the tip 48 of the electrode 14 toward the tip 48 of the electrode 16, since the electrode 16 is solidly supported in relationship to the advancing plunger 66. The center 43 of the electrode 14 becomes instrumental in the ensuing adjustment of the surge protector 11. Since the center 43 has the thinnest or least cross-sectional area, a stress resulting from the force applied through the plunger 66 becomes concentrated and most severe in the center 43. As a result of the applied force, the center 43 is stressed beyond its yield point and plastically and permanently deforms or elongates to permit the plunger 66 to permanently decrease the width of the gap 31. As a result of the relatively thinner material cross section of the center 43 in relationship to the thickness and bulk of the tip 48 and the base 41 of the electrode 14, plastic strain or elongation is confined to the center 43, and there is substantially and preferably no plastic deformation of the base 41 or of the tip 48 of the electrode 14.

Of course, the plastic deformation of the center 43 is preceded by an elastic deformation and followed by a consequent partial elastic relaxation of the advance of the tip 48 of the electrode 14 toward the electrode 16. The length of the center 43 in the direction of a longitudinal axis 71 through the surge protector 11 is therefore preferably limited to less than the entire depth to which the electrode 14 extends into the housing 12. The length of the center 43 determines the amount of elastic deformation and subsequent relaxation of the yield in the longitudinal direction of the electrode. Even though such relaxation or springing back of the tip 48 of the electrode 14 is minimal, it is preferred to remove the urging force of the plunger 66 before submitting the surge protector 11 to a subsequent test of the above mentioned characteristics $V_B$ and $V_L$.

In the presently preferred apparatus 63, a test set 76 is electrically coupled across the terminals 14 and 16 through the base 62 and through the plunger 66. Such an arrangement permits to alternately narrow the gap 31 by the operation of the plunger 66 and then to remove the force of the plunger 66 against the electrode 14 and after such removal of the force to apply the desirable electrical tests to the surge protector 11. Such a removal or relaxation of the applied force may, however, not be necessary when the amount of elastic relaxation has been determined to remain substantially constant throughout the typical adjustment range. The elastic relaxation is then simply treated as a constant in evaluating the test result of each adjustment.

The results of the tests are used in a decision whether or not to apply a further adjusting advance of the plunger 66 against the electrode 14, and also to determine the severity of such any advance to bring the characteristics of the surge protector 11 into the desired range of values.

As a corollary, the center 43 as a dedicated, strainable section becomes selectively strained, e.g., the strain or elongation in the center 43 of the finally adjusted surge protector 11 is substantially in proportion to an initial deviation of the width of the gap 31 from the predetermined width. Thus, in the limiting situation in which the initial test has determined the gap 31 to already have the predetermined width, the strain or elongation as a limit becomes zero and is thereby still proportional to the initial deviation of the width of the gap 31 from the predetermined width. Of course, as a practical matter, the predetermined width is preferably defined by a desired range of electrical characteristics rather than a single value.

The use of the screw drive 68 and the stepping motor 69 is helpful in quantitatively defining the adjustments to bring the gap width into the range which establishes the desired electrical characteristics. After each adjustment by the plunger 66 a predetermined number of steps may be made by the motor 69 to remove the force of the plunger 66 against the electrode 14 without causing the plunger 66 to break electrical contact with the electrode 14. The same number of steps can then be imparted by the stepping motor 69 to drive the plunger 66 in the advancing direction after an electrical test to return the position of the plunger to the same starting position which the plunger 66 held prior to the force-removing stepping motion of the motor 69. Electronic counter controls which permit the motion of stepping motors, such as the motor 69, to be programmed are well known in the art. Of course, it should also be understood that the pitch of the screw drive 68, which is a linear movement of the plunger 66, is quantitatively related to the number of steps taken by the stepping motor 69.

The test set 76 which is presently preferred to be used in conjunction with the apparatus 63 may, for instance, be commercially obtained in modular form from Keyteck Corporation. Test sets similar to the test set 76 are used, for example, in routinely testing prior art surge protectors. Typical tests include an application of a relatively slow voltage ramp, increasing in voltage at a rate of 2,000 volts per second. The test set registers the voltage at which the gas ionization occurs and the surge protector becomes conductive. The test establishes a value for the voltage breakdown characteristics $V_B$. A second test applies a voltage ramp at a rate of 1,000 volts per $2\times10^{-6}$ seconds. The recorded voltage value represents the surge limiting voltage $V_L$. Another test applied through the preferred test connections is a resistance test to establish a resistance value across the electrodes 14 and 16 when the surge protector is in a non-conductive state under normal operating voltages of the communications system which is to be protected. The final forward and backward resistances typically are specified to be greater than $10^8$ ohms. Of course, it should be understood, that the test connections from the test set 76 to the electrodes 14 and 16 need not be made through the apparatus 63. Separate testing is within the scope of this invention, however, alternate adjustment and testing steps are best performed by the preferred connections of the test set 73 as shown in FIG. 2.

FIG. 3 illustrates in summary a preferred assembly process. In particular, the mechanical adjustments to the surge protector 11 can be repeated in decreasing smaller increments until precise characteristics are seen in the result of a final test. However, the process need not terminate in a final test but may instead terminate in a final adjustment step which is with reasonable certainty expected to establish the desired characteristics in the surge protector.

While the above test set 73 is presently preferred and found to be sufficient to make surge protectors 11 in accordance with this invention, it must be realized that the available functions in the test set 73 are not limiting to the scope of the invention. For instance, it is contemplated to establish voltage breakdown characteristics by measuring and recording capacitances between the electrodes 14 and 16, and to correlate the measured capacitances to the widths of the gaps 31 of the corresponding surge protectors 11.

Values of such capacitances are believed to be affected not only by the gap width but also by a dielectric constant between the electrodes 14 and 16 as capacitor plates, e.g., by the condition of the pressurized gas. Consequently, a sufficiently accurate correlation between the capacitances on the one hand and the voltage breakdown characteristics on the other hand is believed to exist.

Also, it is contemplated within the scope of this invention to make changes to the disclosed structure of the surge protector 11. For instance, a significant feature of the surge protector 11 in FIG. 1 is the strength of the housing 12. A structurally weak housing 12 may collapse under the adjusting force applied through the plunger 66 to the electrode 14. However, it is within the scope of this invention to temporarily retain the base of the electrode 14 in relationship to the apparatus 63. For instance, in FIG. 2 there is shown schematically and in phantom lines a clamping bracket 81 which relieves the surge protector 11 from compressive stresses as a result of the adjusting force applied by the plunger 66. Such a stress relieving hold on the electrode to be adjusted may be beneficial when the shape of the housing is not as rigid as in the disclosed embodiment, or when the housing is of a more fragile glass material than the preferred aluminum oxide ceramic.

Furthermore, the surge protector 11 has been described as a device with only two electrodes 14 and 16. Surge protectors having more than two electrodes, for example, at least a third, spark initiating electrode, are known in the art and, of course, their fabrication is also within the scope of this invention. Also known dual gap surge protectors can be improved by the present invention. It should therefore be understood that the described invention is not limited to surge protectors having two electrodes or a single gap, even though special advantages are derived by the invention in the manufacture of the described surge protector 11.

It may further be contemplated to induce an adjustment of the gap by a compressive force exerted against the housing 12 itself. In such a case, however, the housing should include a collapsible portion which yields in a controlled manner to a compressive force exerted against the housing. As it is seen from the above, various changes and modifications are possible within the spirit and scope of this invention which is intended to be limited only by the scope of the appended claims.

What is claimed is:

1. A method of making a surge protector having an elongate, electrically insulating housing including at least two electrodes one of which is mounted into each of two opposite ends of such housing, such electrodes having opposing surfaces transverse to a longitudinal axis of the housing which comprises:

assembling the at least two electrodes and the housing to form a gastight envelope holding the electrodes in spaced relationship opposite one another within the envelope;

testing electrical characteristics between such electrodes to determine a deviation of the width of a gap between such electrodes from a predetermined width; and straining at least one tubular portion of said at least two electrodes of said envelope in the direction of the longitudinal axis of the housing to move at least one of the electrodes toward a face of one other of the at least two electrodes until the gap of a predetermined width has been established therebetween.

2. A method of making a surge protector which comprises:

forming a gastight envelope of a housing and at least two electrodes extending from opposite ends in the direction of a longitudinal axis into such housing and being spaced to form a gap transverse to such longitudinal axis of the housing between opposing faces of such electrodes, said envelope retaining a gas; and straining a dedicated tubular strainable section of at least one of the electrodes of said envelope in a direction of the longitudinal axis of the housing and in proportion to a deviation of a width of the gap from a predetermined width to narrow the width of the gap until the predetermined width of the gap has been obtained.

3. A method of making a surge protector according to claim 2, wherein straining a dedicated, tubular strainable section comprises:

exerting a force against a recessed portion of at least one of the electrodes, thereby straining the dedicated section of such electrode and advancing another portion thereof toward an opposite one of the electrodes; and testing the electrical characteristics between the electrodes of the surge protector to determine whether the predetermined width has been obtained.

4. A method of making a surge protector according to claim 3, the method including a sequence of alternate steps of exerting a force and testing until such time that the predetermined width has been obtained.

5. A method of making a surge protector according to claim 4, wherein the predetermined width is determined to have been obtained by determining voltage breakdown and electrical discharge characteristics between the electrodes.

6. A method of making a surge protector according to claim 4, wherein the predetermined width is determined to have been obtained by determining capacitive characteristics between the electrodes.

* * * * *